(12) United States Patent
Kuchenmeister et al.

(10) Patent No.: US 12,189,638 B1
(45) Date of Patent: Jan. 7, 2025

(54) GENERATING RESPONSES TO STRUCTURED QUERIES USING RELEVANT DATA EXTRACTED FROM DATABASES

(71) Applicant: Goldman Sachs & Co. LLC, New York, NY (US)

(72) Inventors: Konstantin Kuchenmeister, New York, NY (US); Alysa V Shcherbakova, Jersey City, NJ (US); Demetrius Rowland, Dallas, TX (US); Bing Xiang, Mount Kisco, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

(21) Appl. No.: 18/645,990

(22) Filed: Apr. 25, 2024

(51) Int. Cl.
*G06F 16/2457* (2019.01)
*G06F 16/22* (2019.01)

(52) U.S. Cl.
CPC .... *G06F 16/24578* (2019.01); *G06F 16/2246* (2019.01)

(58) Field of Classification Search
CPC .............. G06F 16/24578; G06F 16/2246
See application file for complete search history.

(56) References Cited

U.S. PATENT DOCUMENTS

2020/0110835 A1\* 4/2020 Zhao .................. G06N 5/022
2024/0176805 A1\* 5/2024 Liu ..................... G06F 40/40

\* cited by examiner

*Primary Examiner* — Hau H Hoang
(74) *Attorney, Agent, or Firm* — Fenwick & West LLP

(57) ABSTRACT

The described system provides a dual-model framework for data retrieval from complex data environments such as webpages on the internet. It combines a traditional similarity model that identifies relevant data from vast amounts of data and a large language model that delves deeper into the relevant data to uncover specifics. The models, in conjunction, provide a method for providing responses to structured queries about an entity. A source investigator receives a request for information about an entity alongside a set of keywords. A source datastore is identified for the entity and a similarity model is applied to the datastore to determine relevancy scores for data within. Data and/or nodes above a relevancy threshold are stored as relevant data. Then, using the large language model, the investigator generates responses to the structured queries based on the relevant data and provides responses to the user system.

19 Claims, 5 Drawing Sheets

GENERATING RESPONSES TO STRUCTURED QUERIES USING RELEVANT DATA EXTRACTED FROM DATABASES

FIELD OF DISCLOSURE

The present invention generally relates to data retrieval and understanding, specifically to a combined model framework for mining and extraction of relevant and precise data from vast, context-rich, and complex data environments such as the internet.

BACKGROUND

The boom in data production and availability across numerous platforms and sources, particularly the internet, has revolutionized various sectors. Despite its promise for boundless opportunities in data retrieval, the sheer volume, diversity, and disorganization of this information often presents a significant obstacle to retrieving precise, relevant, and useful information promptly and accurately.

Although there have been several attempts to improve data retrieval through artificial intelligence (AI) technology and machine learning algorithms, these methods tend to fall short in navigating the intricacies of human language and culture, which play a fundamental role in dictating the contextual relevance and interpretation of information. These technological solutions, while sometimes effective in processing vast amounts of data, often struggle with complexities and irregularities of data presentation across various websites, resulting in an inability to acquire precise and specific information.

Therefore, there is a need for a more efficient and effective solution that not only handles the volume of available data but also accurately discerns relevant data using context. The systems and methods described herein address this need by providing such a solution.

SUMMARY

In some aspects, the techniques described herein relate to a method for providing responses to structured queries about an entity: receiving, from a user system at a network system, a request to generate responses to structured queries about an entity; generating, automatically using the network system, a set of keywords configured to identify relevant information to generate responses to the structured queries by applying a language model to the request, the language model configured to identify semantically relevant keywords based on the entity and the structured queries; extracting, using the network system, relevant data from a source datastore of the entity by applying a similarity model to the source datastore, the source datastore organized in a hierarchical structure including a plurality of information nodes in a plurality of layers, and the similarity model, when applied to the source datastore, configured to: beginning at a top-most information node of the hierarchical structure and for each information node of the plurality identified as a relevant information node: identify a set of information nodes at a next lower layer of the hierarchical structure, each information node in the set represented by a label on an information node on a current layer of the hierarchical structure, determine, for each information node in the set, a relevancy score for the information node, the relevancy score quantifying similarities between the label for the information node and the set of keywords, for each information node having a relevancy score above a threshold, determine the information node is a relevant information node and store data at the information node in an entity datastore as relevant data, and for each information node having a relevancy score below the threshold, determine the information node is a non-relevant information node; and determining, using the network system, responses to the structured queries using the relevant data extracted from relevant information nodes stored in the entity datastore.

In some aspects, the techniques described herein relate to a method, wherein: the source datastore includes the top-most information node, the top-most information node is at a highest layer in the hierarchical structure of the source datastore, the top-most information node includes labels to the set of information nodes, and the set of information nodes are at the next lower layer below the highest layer in the hierarchical structure of the source datastore.

In some aspects, the techniques described herein relate to a method, wherein the similarity model: determines a first information node in the set of information nodes is a relevant information node and stores data from the first information node in the entity datastore, and determines a second information node in the set of information nodes is a non-relevant information node.

In some aspects, the techniques described herein relate to a method, wherein: the first information node includes labels to a set of additional information nodes, and the set of additional information nodes are at an additional next lower layer below the next lower layer in the hierarchical structure of the source datastore; and wherein the similarity model: identifies a first additional information node in the set of additional information nodes is a relevant information node and stores information from the first additional information node in the entity datastore, and identifies a second additional information node in the set of additional information nodes is a non-relevant information node.

In some aspects, the techniques described herein relate to a method, further including: generating, automatically using the network system, the structured queries by applying a language model to the request, the language model configured for identifying semantically relevant structured queries about the entity based on the entity and language in the request.

In some aspects, the techniques described herein relate to a method, wherein the structured queries are automatically generated by the language model without feedback from the user system.

In some aspects, the techniques described herein relate to a method, wherein determining the responses to the structured queries further includes applying a large language model to the relevant data stored in the entity datastore, the large language model configured to: generate, based on the structured queries, embeddings configured to determine responses to the structured queries from the relevant data, and determine, using the generated embeddings, responses to the structured queries from the relevant data.

In some aspects, the techniques described herein relate to a method, wherein the responses to the structured queries are generated without feedback from the user system.

In some aspects, the techniques described herein relate to a method, further including: identifying, automatically using the network system, a source datastore of the entity using the request by applying a language model to the entity and the request.

In some aspects, the techniques described herein relate to a method, wherein the source datastore is identified without feedback from the user system.

In some aspects, the techniques described herein relate to a method, wherein: information in a first information node of the plurality of information nodes is stored as a type of information, information in a second information node of the plurality of information nodes is stored as a second type of information, and the first type is different than the second type.

In some aspects, the techniques described herein relate to a method, wherein the similarity model applies a cosine similarity function to compare information in each node to the set of keywords.

In some aspects, the techniques described herein relate to a method, wherein the source datastore is any of a website, a topic graph, a file directory, or an operating system registry.

In some aspects, the techniques described herein relate to a non-transitory computer-readable storage medium including computer program instructions for providing responses to structured queries about an entity, the computer program instructions, when executed by one or more processors, causing the one or more processors to: receive, from a user system at a network system, a request to generate responses to structured queries about an entity; generate, automatically using the network system, a set of keywords configured to identify relevant information to generate responses to the structured queries by applying a language model to the request, the language model configured to identify semantically relevant keywords based on the entity and the structured queries; extract, using the network system, relevant data from a source datastore of the entity by applying a similarity model to the source datastore, the source datastore organized in a hierarchical structure including a plurality of information nodes in a plurality of layers, and the similarity model, when applied to the source datastore, configured to: beginning at a top-most information node of the hierarchical structure and for each information node of the plurality identified as a relevant information node: identify a set of information nodes at a next lower layer of the hierarchical structure, each information node in the set represented by a label on an information node on a current layer of the hierarchical structure, determine, for each information node in the set, a relevancy score for the information node, the relevancy score quantifying similarities between the label for the information node and the set of keywords, for each information node having a relevancy score above a threshold, determine the information node is a relevant information node and store data at the information node in an entity datastore as relevant data, and for each information node having a relevancy score below the threshold, determine the information node is a non-relevant information node; and determine, using the network system, responses to the structured queries using the relevant data extracted from relevant information nodes stored in the entity datastore.

In some aspects, the techniques described herein relate to a non-transitory storage medium, wherein: the source datastore includes the top-most information node, the top-most information node is at a highest layer in the hierarchical structure of the source datastore, the top-most information node includes labels to the set of information nodes, and the set of information nodes are at the next lower layer below the highest layer in the hierarchical structure of the source datastore.

In some aspects, the techniques described herein relate to a non-transitory storage medium, wherein the similarity model: determines a first information node in the set of information nodes is a relevant information node and stores data from the first information node in the entity datastore, and determines a second information node in the set of information nodes is a non-relevant information node.

In some aspects, the techniques described herein relate to a non-transitory storage medium, wherein: the first information node includes labels to a set of additional information nodes, and the set of additional information nodes are at an additional next lower layer below the next lower layer in the hierarchical structure of the source datastore; and wherein the similarity model: identifies a first additional information node in the set of additional information nodes is a relevant information node and stores information from the first additional information node in the entity datastore, and identifies a second additional information node in the set of additional information nodes is a non-relevant information node.

In some aspects, the techniques described herein relate to a non-transitory storage medium, further including: generating, automatically using the network system, the structured queries by applying a language model to the request, the language model configured for identifying semantically relevant structured queries about the entity based on the entity and language in the request.

In some aspects, the techniques described herein relate to a non-transitory storage medium, wherein the structured queries are automatically generated by the language model without feedback from the user system.

In some aspects, the techniques described herein relate to a system including: one or more processors; and a non-transitory computer-readable storage medium including computer program instructions for providing responses to structured queries about an entity, the computer program instructions, when executed by the one or more processors, causing the one or more processors to: receive, from a user system at a network system, a request to generate responses to structured queries about an entity; generate, automatically using the network system, a set of keywords configured to identify relevant information to generate responses to the structured queries by applying a language model to the request, the language model configured to identify semantically relevant keywords based on the entity and the structured queries; extract, using the network system, relevant data from a source datastore of the entity by applying a similarity model to the source datastore, the source datastore organized in a hierarchical structure including a plurality of information nodes in a plurality of layers, and the similarity model, when applied to the source datastore, configured to: beginning at a top-most information node of the hierarchical structure and for each information node of the plurality identified as a relevant information node: identify a set of information nodes at a next lower layer of the hierarchical structure, each information node in the set represented by a label on an information node on a current layer of the hierarchical structure, determine, for each information node in the set, a relevancy score for the information node, the relevancy score quantifying similarities between the label for the information node and the set of keywords, for each information node having a relevancy score above a threshold, determine the information node is a relevant information node and store data at the information node in an entity datastore as relevant data, and for each information node having a relevancy score below the threshold, determine the information node is a non-relevant information node; and determine, using the network system, responses to the structured queries using the relevant data extracted from relevant information nodes stored in the entity datastore.

Figure 1:
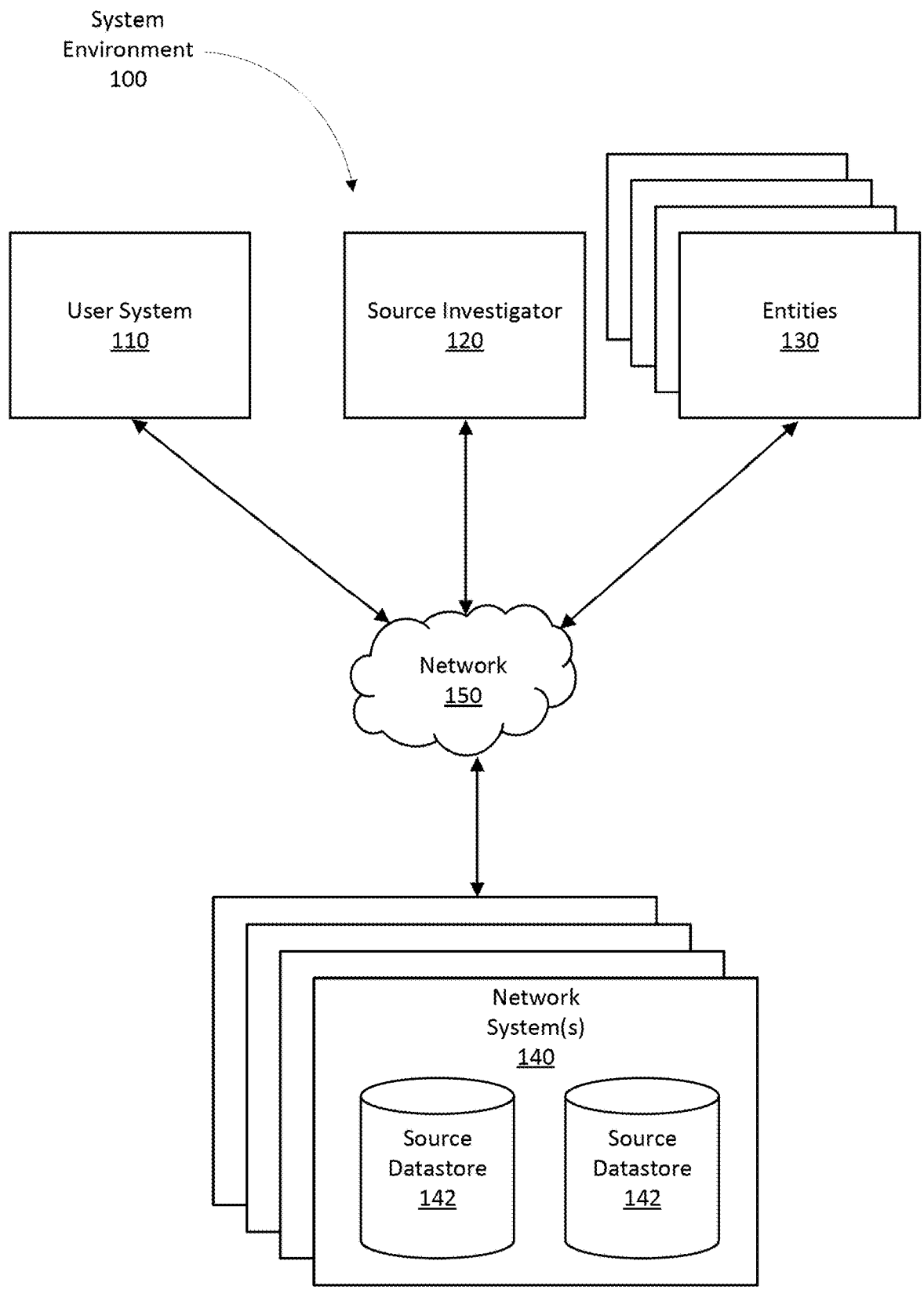
FIG. 1 illustrates a system environment for a source investigator, according to an example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

With the advent of data digitization and the internet, the world has seen an unprecedented multiplication of available information sources. Although this array of data offers vast opportunities for knowledge and insight, it also acts as a double-edged sword, posing challenges for both human and technological means of data analysis. The sheer volume and diversity of data have made it increasingly difficult to extract precise and valuable information promptly and correctly, creating hurdles in data interpretation, understanding, and accuracy.

This explosion of information, especially as it represents itself on the Internet in the form of websites and other digital interfaces, has, in many cases, made it more difficult to pinpoint fundamental answers to specific queries. For example, locating a simple piece of information on a densely populated website can become an arduous task, which seems counterintuitive given the abundance of available information. As a result, the promise of ease and immediacy in access to knowledge often falls short, particularly when interacting with digital information sources.

As an illustrative example, consider a human user attempting to locate specific information about the safety measures in place at a factory by navigating the factory's intricate website. Despite the abundance of reports, articles, blogs, and safety guidelines, the user may struggle to extract the exact data they need-perhaps a specific safety incident rate or a detailed description of the safety training process for employees. The failure to find this information efficiently can be attributed to several factors: perhaps the relevant data is buried deep within a lengthy report or obscured by technical jargon, or the website's organization might be non-intuitive, causing crucial safety guidelines to be scattered across different web pages. Additionally, the cognitive load of sifting through huge volumes of information can lead to oversight or misinterpretation of vital data.

Similarly, when a machine learning algorithm, designed to parse and extract relevant data from websites, takes on the task, it often struggles to deliver accurate and effective results. The reasons could be technical in nature: inadequate training data or misrepresentation thereof; overfitting or underfitting of models; limitations in capturing the idiosyncrasies of human language and context; inadequate handling of semantic complexities, and more. More specifically for the context of information extraction from websites, a machine learning model oftentimes grapples with the complexities and nuances of human language. Unlike structured data, human language is steeped in context, with interpretations often relying heavily on cultural nuances, tone, or the specific sequence of words. In turn, standard machine learning algorithms sometimes fail to fully comprehend these subtleties. Further compounding this problem is the diversity and dynamism of website structures. Websites differ widely in their design and layout, making it challenging for a machine-learning model to effectively parse information from them.

In response to these challenges, a framework based on a dual-model approach emerges as a promising solution and is described herein. The solution combines the power of two distinct models: a traditional similarity model that sieves through vast data and identifies relevant information, and a large language model (or, more generally, a language model) that then dives deeper, focusing on the filtered relevant information to detect the specifics.

This two-pronged approach brings efficiencies and accuracy to the process that surpass traditional methods. The ability of the first model to broadly classify data and discern relevance minimizes the amount of data that the second, large language model needs to process. This division of labor not only augments speed in localizing information but also enables a more focused and accurate data retrieval process, ultimately making it a superior technical solution in the world of data mining and retrieval.

Additionally, this technical solution succeeds in data spaces where humans would typically fail or be inefficient. To expand, human analysts can be overwhelmed by dense and diverse data such as complex websites with varying types of information, making errors in identification, interpretation, or retrieval. This dual-model framework, however, can process vast amounts of information at a pace and accuracy level far beyond human capabilities. Moreover, the dual-model approach doesn't tire or succumb to cognitive biases, providing consistent performance over time and across diverse data sets. By processing information at speed and scale while avoiding human cognitive biases and restrictions, this dual-model system outshines not only traditional computational methods but also the human ability to extract useful and precise data from extensive and complex data landscapes.

II. System Environment

A source investigator in a system environment generates an insight response for an insight request received from a user system. FIG. 1 illustrates a system environment for a source investigator, according to an example embodiment. The system environment 100 includes a user system 110, a source investigator 120, entities 130, a network system 140, and a network 150. Each network system 140 may include one or more source datastores 142. Some embodiments of system environment 100 may have different systems and modules than those described herein. Similarly, functions of the systems and modules can be distributed within the system environment 100 in a different manner than is described herein, or the system environment 100 may incorporate systems or modules from other system environments (not pictured).

Within the system environment, the user system 110 generates an insight request. An insight request is a request for information about an entity 130 in the system environment 100. An entity 130, broadly, creates and stores information about itself in source datastores 142 on network systems 140. Thus, a source datastore 142 is an information source including data that may be relevant in providing the information requested in an insight request.

The user system 110 transmits the insight request to the source investigator 120. The source investigator 120 generates an insight response to the insight request using a source datastore 142 associated with the entity in the insight request. With this context, a source investigator 120, at a high level, is a system including machine-learned models trained to identify and extract relevant data regarding the insight request using a source datastore 142 associated with that entity 130. The source investigator 120 identifies the information requested about the entity 130 in the insight request in the extracted, relevant data. The source investigator 120 generates an insight response including the identified information.

To provide a contextual example, consider a user operating a computer system (e.g., a user system 110). The user generates an insight request seeking information about the climate footprint of an energy production company (e.g., an entity 130). The energy company creates and stores data describing its operations on an internet website (e.g., a source datastore 142). The user transmits the insight request to the source investigator 120. The source investigator 120 applies machine-learned models to the insight request and information on the company's websites to identify the information requested in the insight request (e.g., climate footprint information). The source investigator generates and transmits an insight response to the user including identified information that responds to the insight request.

The description now turns to a more detailed description of the elements of FIG. 1. The system environment 100 includes a user system 110. The user system 110 is a computing device operated by a user and used to generate insight requests and receive insight responses. User system 110 may be a smartphone, tablet, portable computer, or other such device. User system 110 includes software e.g., an application or operating system that implements the various embodiments of the invention in whole or in part. In some embodiments, the capabilities of the user system 110 may also be provided by a computer system within the system environment 100, such as, for example, an interaction portal on the source investigator 120 (e.g., a webpage) or an API provided by the source investigator 120.

The system environment 100 includes a source investigator 120. The source investigator 120 receives an insight request from a user system 110, identifies relevant data pertaining to the insight request in a source datastore 142, determines an insight response using the relevant data, and provides the insight response to the user system 110. The source investigator 120 is described in greater detail in regard to FIG. 2.

The system environment 100 includes one or more entities 130. An entity 130 operates within the world to provide, e.g., goods and services, products, digital content, physical content, etc. During its operation, the entity 130 may generate information describing its various operations. For example, the entity 130 may generate reports about safety measures for its services, quantities and sales and figures for its products, digital marketing content for social media environments, etc. The entity 130 may store (or publish) this information to a network system 140 and/or source datastores 142. For example, the entity 130 may store information about its operations on a website on the Internet, a social media page on a social media platform, a digital library, etc.

The system environment 100 includes a network system 140. A network system 140 is an information ecosystem accessible via the network 150. As an example, the network system 140 may be a web hosting service provider hosting websites on the Internet. Thus, in the aggregate, network systems 140 in the system environment 100 can represent the web-hosting services that make up the Internet. In some examples, the network system 140 may represent something at a lower level than the Internet as a whole. For example, the network system 140 may represent a publicly or privately accessible database, a specific website or content platform, etc. Whatever the case, the network system 140 is configured to store information about an entity such that it is accessible via the network 150.

The network system 140 includes one or more source datastores 142. A source datatore 142 is a repository for digital information. In some examples, a source datastore 142 stores digital information as a set of information nodes organized in a hierarchical structure. For example, a given information node in the hierarchical structure may have a child information node, a grandchild information node, a parent information node, a grandparent information node, a sibling information node, etc. Some examples of source datastores 142 that include information nodes organized in a hierarchical structure include a webpage, a topic graph or topic tree, file systems in a database, a file directory, operating system registries, large data sets, etc.

Additionally, each information node in the source datastore 142 may store information in different manners. For example, information nodes may store information in HyperText Markup Language ("HTML") or a portable document format (a "PDF"), as its Uniform Resource Locator ("URL"), etc. More broadly, however, information nodes may store information as text, numerical data, images, videos, etc. Within the hierarchical structure, different information nodes may store information in different manners. For instance, a first information node may store information as HTML, while a second, child information node to the first information node stores information as a video.

To provide a high-level example, a source data store may include a highest-layer information node in the hierarchical structure, e.g., Node A. Within Node A, there may be labels or links to various information nodes at a next-lower layer of the hierarchical structure, e.g., labels for Node A/A, Node A/B, and Node A/C. Each of Node A/A, Node A/B, and Node A/C are children node to Node A. Moving a step further in this example, Node A/A does not have additional children nodes. Node A/B includes the label for two additional children nodes that exist at a layer lower than the A/B layer, e.g., Node A/B/A and Node A/B/B. Node A/C has three children nodes at the layer lower than the A/C layer, e.g., Node A/C/A, Node A/C/B, and Node A/C/C.

To provide a contextual example, a source datastore 142 may include a website hosted by a network system 140. In this case, each page (e.g., URL on the website) is an information node in the set of information nodes making up the website. So, as an example, the URL EntityA.com is an information node. Additionally, the URLs of the various pages also reflect the hierarchical structure of the website. For instance, EntityA.com may be a parent information node, while EntityA.com/EnergyPlan may be a child information node. Of course, other configurations of a source datastore 142 are also possible, and, additionally, other methods of indicating the hierarchical structure within the source datastore 142 are also possible.

The system environment 100 includes a network 150. The network 150 may be any suitable communications network for data transmission. In an embodiment such as that illustrated in FIG. 1, the network 150 uses standard communications technologies and/or protocols and can include the Internet. In another embodiment, the entities use custom and/or dedicated data communications technologies.

III. Source Investigator

As described above, the source investigator 120 receives an insight request from a user system 110, identifies the information to respond to the request, and provides the identified information as an insight response to the user system 110.

Figure 2:
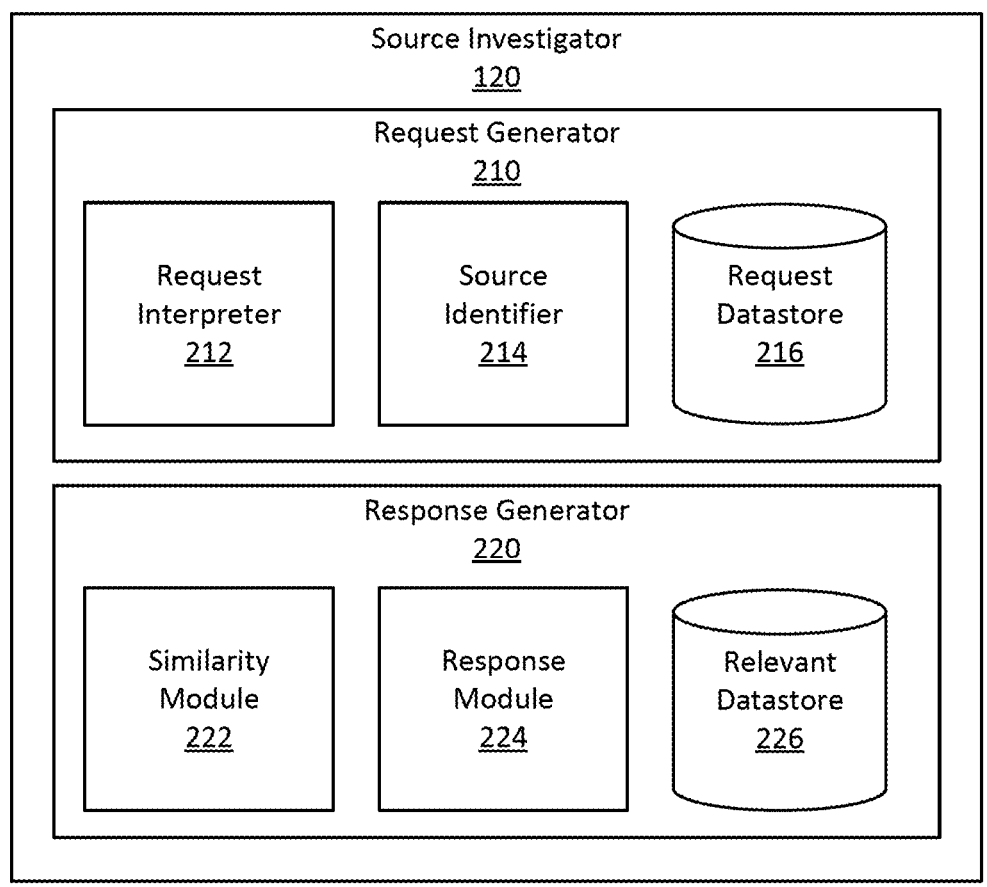
FIG. 2 illustrates a source investigator according, to an example embodiment.

FIG. 2 illustrates a source investigator according, to an example embodiment. The source investigator includes a request generator 210 and a response generator 220. The request generator includes a request interpreter 212, a source identifier 214, and a request datastore 216. The response generator 220 includes a similarity module 222, a response module 224, and a relevant datastore 226. Some embodiments of source investigator 120 may have different systems, modules, and datastores than those described herein. Similarly, functions of the systems, modules, and datastores can be distributed within the source investigator 120 (or the system environment 100) in a different manner than is described herein.

Request Generator

The source investigator 120 includes a request generator 210. The request generator 210 generates a request package. A request package includes a generated query, an identified entity, an identified datastore, and a keyword set. A generated query is a data structure configured to identify the information requested in the insight request using relevant data extracted from source datastores 142. An identified entity 130 is the entity 130 about which the query gathers the information requested in the insight request. An identified datastore is a source datastore 142 associated with the identified entity and from which information relevant to the generated query can be collected. A keyword set consists of keywords that aid in identifying information nodes in the identified source datastore 142 which include information relevant to the generated query.

To generate a request package, at a high level, the request generator 210 inputs an insight request received from a user system 110, generates a query based on the insight request, identifies an entity 130 for the query based on the insight request (the "identified entity"), identifies a source datastore 142 associated with the identified entity (the "identified datastore"), and generates the keyword set to identify relevant data in the identified datastore. To provide a brief contextual example, an insight request may include, "Provide an Environmental Report on Entity A." In this case, the request generator 210 generates a query that identifies information for the Environmental Report, identifies Entity A as the entity about which the Environmental Report will be generated, identifies a source datastore 142 associated with Entity A (e.g., EntityA.com) which will be probed to answer the generated query, and identifies keywords that aid in identifying information nodes (e.g., webpages) in the identified datastore that may include information relevant to the query.

The description now turns to a more detailed description of the elements of FIG. 2. The request generator 210 includes a request interpreter 212. The request interpreter 212 generates queries and identifies entities using a received insight request. So, using the example above, the request interpreter 212 generates a query that will provide information for the "Environmental Report" and identifies "Entity A" as the identified entity about which the Environment Report will be generated.

The request generator 210 generates queries that extract information relevant to the insight request ("generated query"). That is, the generated query is configured such that the response generator 220 generates a response to the insight request using the generated query that provides the required information therein. To illustrate, continuing the example above, an "Environmental Report" may include ten different, relevant environmental metrics. In this case, the generated query's structure may be a table with ten rows and two columns. In the table, each of the ten rows corresponds to each of the different environmental metrics. The first column includes, e.g., a description of the environmental metric, and the second column includes, e.g., a blank space. As described in greater detail below, the response generator 220 populates relevant data for each environmental metric to the second column based on the information in the first column (i.e., formulates responses to the queries in the first column). To illustrate, the first column may include, "Average tons of $CO_2$ produced by month," and the second column is a blank space where the appropriate information is populated by the response generator 220. The data structure is not limited to tables and may include, e.g., documents and images, as appropriate.

In various configurations, a user system 110 may provide an insight request in different formats, and, therefore, the request interpreter 212 may generate queries in different ways to compensate for those different formats. For example, the request interpreter 212 may access a preformatted query from a request datastore 216 based on the insight request. To illustrate, if the insight request specifically requests an "Environmental Report," the request interpreter 212 interprets that information and accesses the appropriate report from the request datastore 230. In some cases, the insight request may include queries for the appropriate report itself. In another example, the request interpreter 212 can apply a machine learning model configured to perform natural language processing of the insight request and output an appropriately structured query. To illustrate, consider an insight request that includes the question, "What are Entity A's top four pollution prevention activities?" In this case, the request interpreter 212 generates a structured query including, e.g., a four-row by two-column table, with each row indicating the appropriate rank of pollution activity. Of course, these two examples are not intended to be limiting and other examples are also possible. For instance, the request interpreter 212 may employ a large language model (LLM), or, more generally, a language model, configured to interpret an insight request and generate the appropriate query. Moreover, the request generator 210 can use any combination of techniques to generate the appropriate query from an insight request.

Similarly, the request generator 210 employs a request interpreter 212 to determine an entity 130 for the query based on insight request (the "identified entity"). Like identifying the query, the request interpreter 212 is configured to determine the identified entity for a given insight request in a variety of ways. For example, in a configuration, the user system 110 may provide both a query and an identified entity, specifically. In this case, the request interpreter 212 determines the identified entity (and/or the query) is the one provided by the user. In other examples, the request interpreter 212 may apply one or more machine-learned models to an insight request to determine the identified entity. For example, the request interpreter 212 may apply a natural language processing model to an insight request to determine the identified entity. To illustrate, consider an insight request including the statement, "Please provide a Carbon Sequestration Report for Entity A." In this case, the request interpreter 212 applies the machine-learned model to the insight request and natural language processing identifies Entity A as the identified entity. Additionally, the request interpreter 212 may employ a large language model (LLM)), or, more generally, a language model, configured to interpret an insight request to determine the identified entity. Moreover, the request interpreter 212 can use any combination of techniques to generate the appropriate query from an insight request.

Additionally, the request interpreter 212 identifies the keyword set to assist in identifying relevant data on source datastores 142 for the generated query (as described below). Again, the request interpreter 212 may perform this functionality in a variety of ways. For example, the request interpreter 212 may access predefined keywords from the request datastore 216 for the identified entity and/or the determined query. In another example, the request interpreter 212 may use an LLM (or other language model) to generate keywords based on the determined query and/or the identified entity (semantically relevant keywords). For instance, if the insight request includes the request "Impact Information on Entity A", the request interpreter (as described above) generates queries relevant to Impact information for Entity A. The request interpreter may then generate keywords that aid in identifying the information in the generated queries about the Entity (e.g., carbon, impact, environment, etc. because Entity A is an entity that produces carbon emissions), In another example, the request interpreter 212 may receive (and/or request) keywords from the user system 110. Of course, these techniques are not intended to be limiting and the request interpreter 212 can use additional techniques and/or a combination of techniques to identify relevant keywords.

The request generator includes a source identifier 214. The source identifier 214 identifies a source datastore 142 corresponding to the identified entity 130 ("identified datastore"). Again, depending on the configuration, the source identifier 214 can perform this functionality in a variety of ways. For example, the source identifier 214 may search one or more network systems 140 for source datastores 142 associated with entity 130. The source identifier 214 may apply one or more algorithms to the search results to determine the source datastore 142 representing the entity. To illustrate, the source identifier 214 may perform a search of source datastores 142 (e.g., websites) on a network system 140 hosting a search engine. The source identifier 214 may apply, e.g., a semantic similarity module to the websites provided by the search engine to determine which of the search results (e.g., websites) is the source datastore associated with the identified entity (e.g., the website with the highest semantic similarity). The semantic similarity module may consider the title of the source datastores 142, data in the generated query, the keyword set, the identified entity, etc. In another example, the source identifier 214 may access a source datastore 142 previously identified to be associated with the identified entity from the request datastore 216. In another example, the source identifier 214 may receive (and/or request) a source datastore 142 from the user system 110.

Response Generator

Returning briefly to a high-level description, the source investigator 120 includes a response generator 220. The response generator 220 inputs the request package and outputs the insight response. As described above, the request package includes a generated query, an identified entity, an identified source, and a keyword set. With this context, broadly, the response generator 220 identifies information nodes in the identified source associated with the identified entity that are relevant to the query based on the keyword set and extracts data included in those information nodes as relevant data. The response generator 220 determines responses to the query using the extracted, relevant data, and generates an insight response including the query responses.

And again, turning to a more in-depth description, the response generator 220 includes a similarity module 222. The similarity module 222 inputs the identified datastore, extracts relevant data, and outputs the relevant data to the relevant datastore 226. The similarity module can identify and extract relevant data in a variety of manners.

In a first example, the similarity module 222 extracts relevant data by applying a similarity model to each information node of the identified source of the identified entity. The similarity module 222 identifies whether data in an information node is relevant data by comparing data found at that information node to keywords in the keyword set. The similarity module 222 stores information identified as relevant data in the relevant datastore 226.

For example, consider a keyword set including words such as "carbon," "environment," and "policy." In this case, the similarity module 222 may identify an information node including information about executives at the identified entity is not similar to the keywords, while the similarity module 222 may identify an information node including information about the entity's carbon offset programs is similar. To expand this example, if the identified datastore is a website on the internet, the similarity module 222 crawls through each distinct webpage of that website to determine if information on that webpage is relevant, or not relevant, based on the keyword set.

In a second example, the similarity module 222 extracts relevant data only from those nodes identified to be relevant nodes. A relevant node is one whose label (e.g., URL, text, etc.) is similar to the keyword set. For instance, consider again the keyword set including carbon, environment, and policy, and an identified datastore that is a webpage. The similarity module 222 identifies a URL on the website that states "Our Sustainability Pledge" with the URL www.EntityA.com/sustainability/pledge. The similarity module 222 determines the node is a relevant node by determining the semantic similarity between the text "Our Sustainability Pledge", the URL, and the keyword set is above a threshold similarity. Correspondingly, the similarity module extracts the information at the sustainability pledge webpage (e.g., a relevant node) and stores it as relevant data in a relevant datastore 226.

In a third example, the similarity module 222 may only analyze additional nodes in a hierarchical structure if its parent node was also identified as a relevant node. For instance, consider an identified source having the hierarchical structure of a top-level node that is a website homepage. The homepage includes links to four children nodes, each of which are individual web pages. The nodes may be indicated by text such as, e.g., "Products," "People," "Mission," and "Contact Us." Using the example keyword set above, the similarity module 222 may identify that the node represented by the "Mission" text is a relevant node (based on its text and URL), and the remaining nodes are not relevant nodes (based on their text and URL). In this case, the similarity module 222 may only analyze a deeper level of nodes under the "Mission" node for relevancy (and correspondingly extract relevant data for those nodes), rather than all of the nodes on the homepage. In other words, the similarity module 222 will only analyze a child node for relevancy if the parent node is already identified as relevant. So, rather than analyzing every node (e.g., webpage) on the identified source (e.g., the website), the response generator may localize its search and extraction to a small fraction of the nodes that are likely to include relevant data (as indicated by the keyword set).

Of course, the various techniques for identifying relevant information for storing in a relevant datastore 226 can be combined or modified. For instance, the similarity module 222 may both identify whether a node is relevant, and only store data in a relevant datastore 226 if the data in that node is also determined to be relevant. Other approaches are also possible.

The similarity module 222 can employ different types of similarity models to determine whether the information in information nodes of an identified datastore (e.g., a source datastore 142) is relevant data. For instance, in an example, the similarity model is a machine-learned model that extracts the information from each information node in a source datastores 142 (e.g., links, URLs, HTML, PDFs, images, video, etc.). The machine-learned model may read that information for each information node and embed the information at each information node into a vector space. In this manner, the machine-learned model generates a representation of the information nodes and their information content in the vector space. Similarly, the machine-learned model may embed keywords of the keyword set into the vector space.

Using these embeddings, the machine-learned model applies a function that generates a relevance score for each information node. The relevance score quantifies similarities between information at each information node and keywords in the keyword set. The function may be a cosine similarity function, but other functions are also possible. Information nodes having a relevance score above a threshold value are identified as relevant data nodes, and information at the relevant information nodes is stored in the relevant datastore 226 as relevant data. Of course, other models and/or model structures are also possible. Whatever the configuration, the similarity module 222 generates a corpus of relevant data about the identified entity using the identified datastore associated with that entity.

The response generator 220 includes a response module 224. The response module 224 inputs the generated query about the identified entity and determines responses to the generated query using relevant data stored in the relevant datastore 226 (which was extracted from the identified datastore associated with the identified entity by the similarity module 222). To do so, the response module applies a response extraction model to relevant data. The response extraction model identifies responses to queries by analyzing the query and identifying the information in the relevant data that provides a correct and contextual response to the query.

For example, consider again the keyword set including the words "carbon," "environment," and "policy." Using these words, the similarity module 222 identifies all the information nodes in the identified datastore relevant to those keywords and stores that data as relevant data in the relevant datastore 226. Typically, the relevant data is a subset of all the data in the identified datastore. The response module 224 determines responses to the query using only information identified as relevant data (instead of also using non-relevant data to determine responses).

The response module 224 can employ different types of response extraction models to determine responses to generated queries. For instance, in an example, the response extraction model is a machine-learned model trained to analyze the content and context of a query given a specific corpus of data. To expand, recall that the response package includes a query, and that query is a data object, or structured data object, configured to generate a response to a request for information. Recall further that the relevant datastore 226 includes data identified to be relevant data to the query by comparing the keyword set to information nodes in the identified datastore for the identified entity. In this context, the machine-learned model may read the query and relevant data and embed them into vector space. The machine-learned model, using these embeddings, applies various functions that generate a response to the queries using the relevant data using the inherent information in the queries and the relevant data.

In a configuration, the response extraction model may be a large language model ("LLM") configured as a generative pre-trained transformer ("GPT"), and the GPT is configured to perform retrieval augmented generation ("RAG") to generate responses to queries. Other language models are also possible. In this case, the LLM may vectorize the queries and relevant data and perform an RAG process on those embeddings to generate responses to the queries. Using the LLM and RAG process allows the response extraction model to analyze the context and content of the various types of information stored identified as relevant to accurately identify responses to the queries.

The response generator 220 generates an insight response using the responses generated by the response module 224. The insight response can take any format necessary to respond to the insight request. For example, if the insight request includes a request for a specific report, the report may be the insight report. Further, if the insight request includes (or generates) a structured data object as a query, the insight response may include the responses in the structured data object of the query. The response generator provides the insight response to the user system 110.

IV. Example Implementation

Figure 3A:
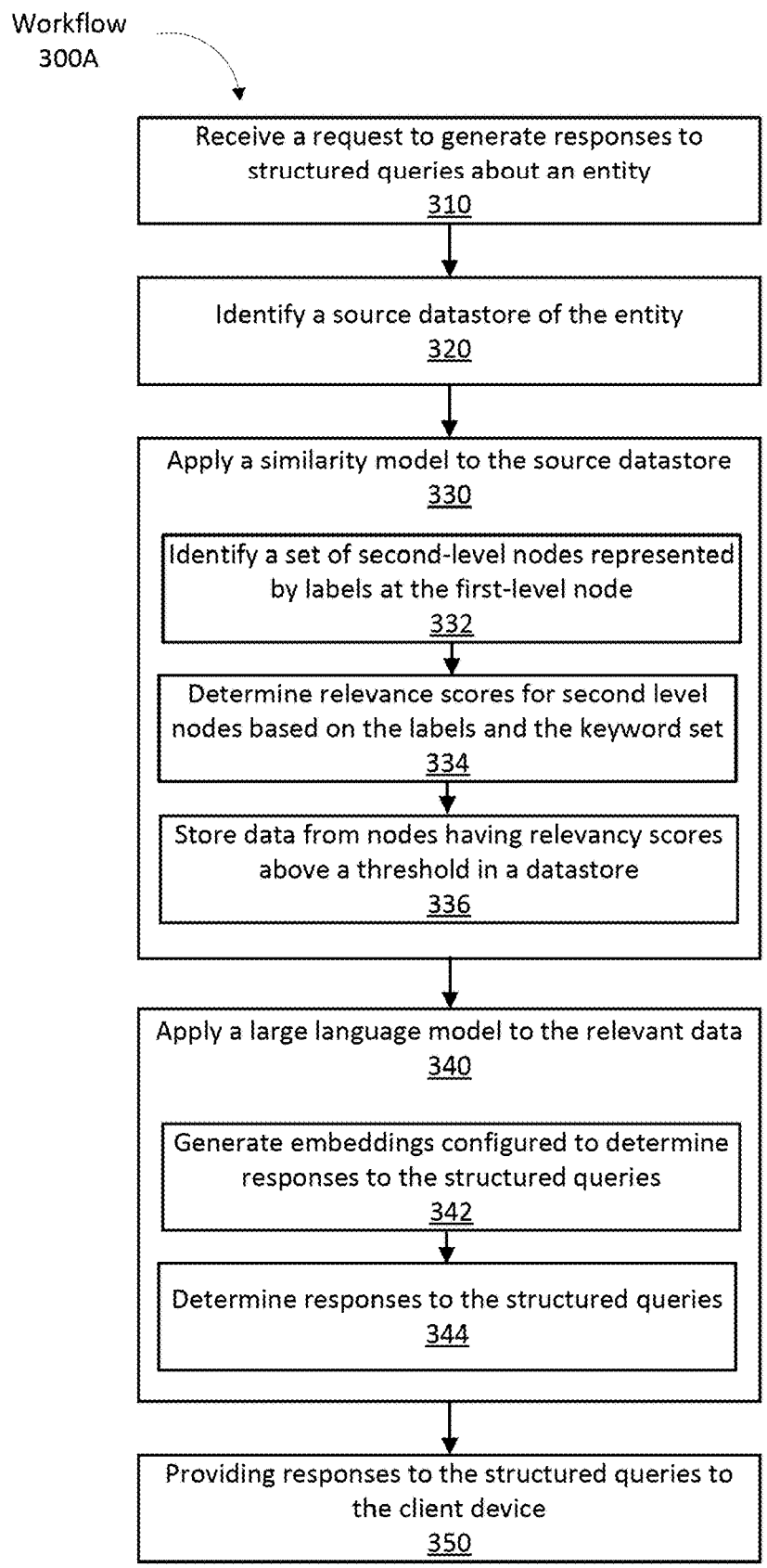
FIG. 3A illustrates a first workflow diagram for generating an insight response to an insight request in a system environment, according to an example embodiment.

FIG. 3A illustrates a first workflow diagram for generating an insight response to an insight request in a system environment, according to an example embodiment. The workflow may include additional or fewer steps, and the steps may occur in a different order. Additionally, one or more of the steps may be repeated or omitted.

In the workflow 300A, the system environment 100 includes a user operating a computer (e.g., user system 110), and the user generates an insight request. The entity maintains a website (e.g., source datastore 142) on a web-hosting service (e.g., network system 140) accessible via the Internet (e.g., network 150). The website is a hierarchical structure of information nodes, with each information node storing information about the entity.

The user transmits the insight request to a source investigator (e.g., source investigator 120), and the source investigator receives 310 the insight request. In this case, the insight request includes a request for environmental, social, and governance ("ESG") information about an energy company (e.g., entity 130). Moreover, the insight request includes a structured data object (e.g., structure queries) configured for identifying the appropriate ESG information about the energy company, and a keyword set configured to identify relevant data on the company's website. In other examples, rather than receiving the query and keyword set, the source investigator may generate the structured query and keyword set (see, e.g., FIG. 3B). Additionally, because the source investigator, in this example, employs an LLM, the structured queries for ESG information may be configured for generating responses to the structured query using the LLM. That is, the structured queries may be prompts engineered for generating accurate responses from an LLM (or some other language model).

The source investigator identifies 320 a source datastore (e.g., website) associated with the energy company. To do so, the source investigator may apply a semantic similarity model to the results of an Internet search for the entity. The source investigator may identify the website having the highest semantic similarity to the entity as the source datastore. In another example, the source datastore may be identified in the insight request explicitly.

The source investigator applies 330 a similarity model to the source datastore (e.g., website) of the entity.

In a first example, the source investigator identifies relevant data across all the nodes of the source datastore. To do so, for each information node (e.g., page) on the website, the similarity model reads data from that node that may be relevant to the ESG query. The similarity model embeds the read data for each page into a vector space, and embeds the keyword set into the vector space. The similarity model determines a relevance score for each page that quantifies the similarities between the read data and the keywords. For data identified as having a relevancy score above a threshold, the similarity model stores the data in an entity datastore (e.g., relevant datastore 226) as relevant data.

In a second example, the source investigator identifies relevant nodes across the source datastore and extracts data from the relevant nodes. To do so, the source investigator first identifies all the relevant nodes at a first-level on the hierarchal structure (e.g., the top-most level of a website, or homepage). To identify relevant nodes on the homepage, the similarity model identifies 332 a set of information nodes at a second-level of the hierarchical structure represented on the homepage. Each second-level node may be represented by a label such as, e.g., a URL represented as text.

The source investigator then applies the similarity model to each of the labels and the keyword set. The similarity model determines 334 a relevance score for each of the second-level nodes that quantifies the similarities between the label and the keyword set (e.g., by embedding the label and the keyword set into a vector space and comparing their semantic similarity). For each second-level node having a relevancy score above a threshold, the similarity model identifies the node as a relevant node. The source investigator may then store 336 all data (or all data identified as relevant at that node) from the relevant node as relevant data.

The source investigator may then apply a similar process to all of the relevant nodes. That is, the source investigator may identify third-level relevant nodes represented at second-level relevant nodes and extract data from that relevant node.

The source investigator applies 340 an LLM to the relevant data in the entity datastore. The LLM generates 342 embeddings using the structured queries, and the embeddings configured to determine responses to those structured queries. The LLM may also generate embeddings using the relevant data, and the embeddings are configured to aid in determining responses to the structured queries using the relevant data. The LLM determines 344 responses to the structured queries from the relevant data using both sets of embeddings.

The source investigator provides 350 an insight response to the insight request. The insight responses are the responses to the queries generated by the LLM. The responses may be in the data structure of the original query, a visualization, or some other method of providing a response to the query about ESG information for the entity.

Figure 3B:
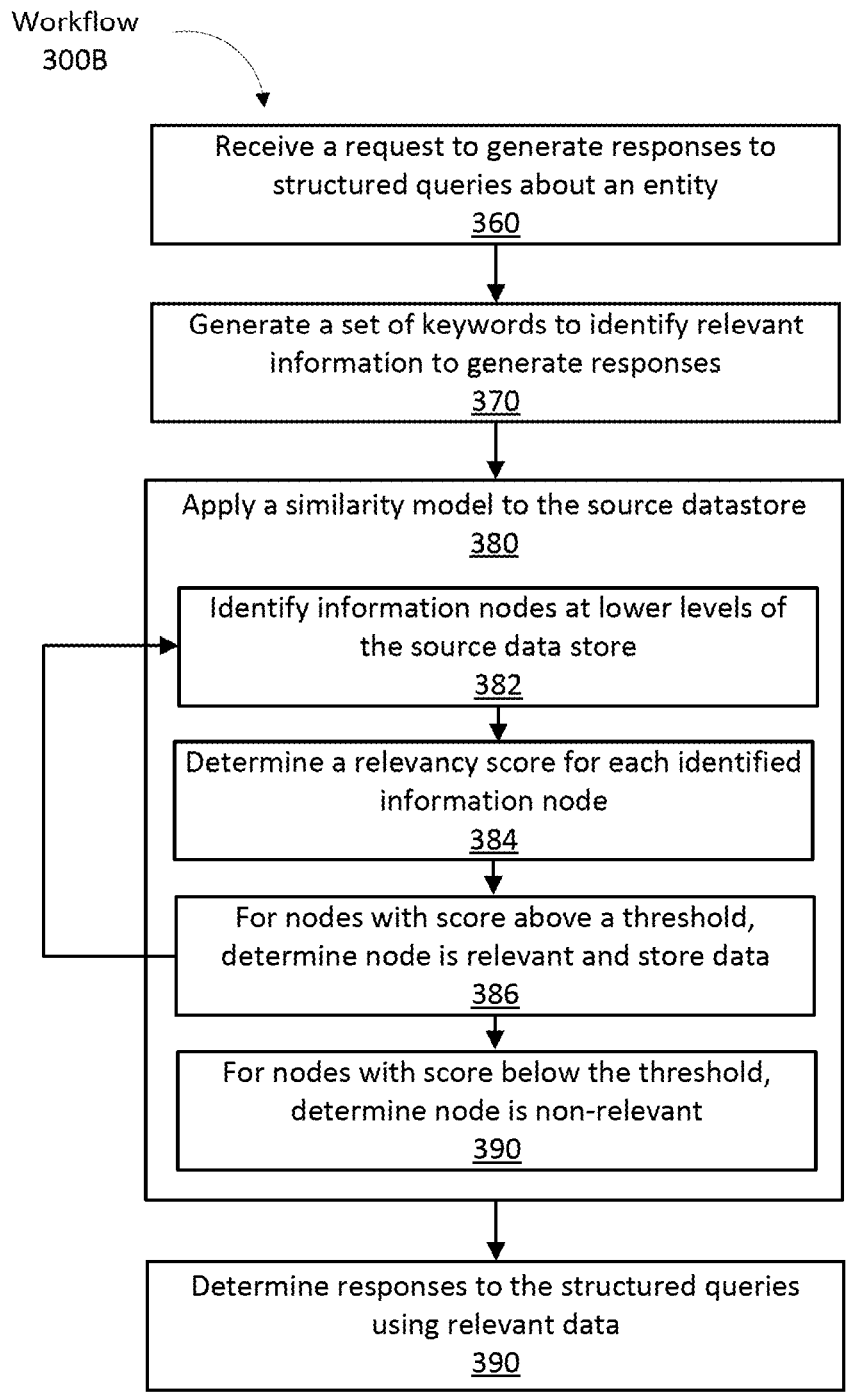
FIG. 3B illustrates a second workflow diagram for generating an insight response to an insight request in a system environment, according to an example embodiment

FIG. 3B illustrates a second workflow diagram for generating an insight response to an insight request in a system environment, according to an example embodiment. The workflow may include additional or fewer steps, and the steps may occur in a different order. Additionally, one or more of the steps may be repeated or omitted.

In the workflow 300B, the system environment 100 again includes a user operating a computer (e.g., user system 110), and the user generates an insight request. The entity maintains a website (e.g., source datastore 142) on a web-hosting service (e.g., network system 140) accessible via the Internet (e.g., network 150). The website is a hierarchical structure of information nodes, with each information node storing information about the entity.

The user transmits the insight request to a source investigator (e.g., source investigator 120), and the source investigator receives 360 the insight request. In this case, the insight request does not include the data structure including the structured queries or the keyword set. Instead, the network system generates the structured queries and keywords as set forth below.

The source investigator generates the structured queries and the keyword set based on the insight request. For instance, the source investigator may apply a language model to the insight request to determine the entity, the nature of the request, and generate structured queries to determine the requested information. Similarly, the source investigator may apply a language model to the insight request, the entity, and the structured queries to generate semantically relevant keywords configured to identify relevant information in source datastores that aid in generating responses to the structured queries. The source investigator may generate the structured queries and/or the keyword set without interacting with, or requesting feedback from, the client system (e.g., automatically).

The source investigator identifies a source datastore (e.g., website) associated with the energy company. To do so, the source investigator may apply a semantic similarity model to the results of an Internet search for the entity. The source investigator may identify the website having the highest semantic similarity to the entity as the source datastore. In another example, the source datastore may be identified in the insight request explicitly. The source investigator may identify the source datastore without interacting with, or requesting feedback from, the client system (e.g., automatically).

The source investigator applies 330 a similarity model to the source datastore (e.g., website) of the entity.

To identify relevant data in the source datastore, the similarity model "crawls" through the webpages of the website. To begin, the similarity model identifies the highest layer information node in the hierarchical structure of the source datastore (e.g., a homepage). The similarity model identifies 332 a set of nodes at a next lower layer of the hierarchical structure represented on the highest layer information node. Each of the information nodes in the set of information nodes are represented by a label on the highest-level information node. For example, the set of information nodes may be a group of links to webpages claiming the homepage as a parent information node.

The similarity model determines 334 a relevancy score for each information node in the set of information nodes (e.g., the children information nodes). To do so, the similarity model may determine a similarity between the keyword set and the information node, the label for the information node (e.g., URL and text for the URL), or the information at the information node. For instance, if the label for an information node is "Environment Policy" the relevancy score for the underlying information node will be high, while if the label for the information node is "Contact Us" the relevancy score for the underlying information node will be low.

For each information node having a relevancy score above a threshold, the similarity model determines 336 the information node is a relevant information node (e.g., probably includes information relevant for determining responses to the structured query). In turn, the similarity model stores the information at the relevant node in the entity datastore as relevant data. Additionally, because the information node is a relevant information node, the similarity model identifies (e.g., returns to step 382) relevant and non-relevant information nodes at that information node.

For each information node having a relevancy score below the threshold, the similarity model determines the information node is a non-relevant information node (e.g., probably does not include information relevant for determining responses to the structured queries). Because the information node is a non-relevant information node, the similarity model does not store data in the information node in the entity datastore. Additionally, because the information node is a non-relevant information node, the similarity model does not identify information nodes (e.g., does not return to step 332) at the information node.

The source investigator determines 390 responses to the structured queries using relevant data stored in the entity datastore. For instance, the source investigator may applies an LLM to the relevant data in the entity datastore. The LLM generates embeddings using the structured queries, and the embeddings configured to determine responses to those structured queries. The LLM may also generate embeddings using the relevant data, and the embeddings are configured to aid in determining responses to the structured queries using the relevant data. The LLM determines responses to the structured queries from the relevant data using both sets of embeddings.

The source investigator provides an insight response to the insight request. The insight responses are the responses to the queries generated by the LLM. The responses may be in the data structure of the original query, a visualization, or some other method of providing a response to the query about ESG information for the entity.

V. Computer System

Figure 4:
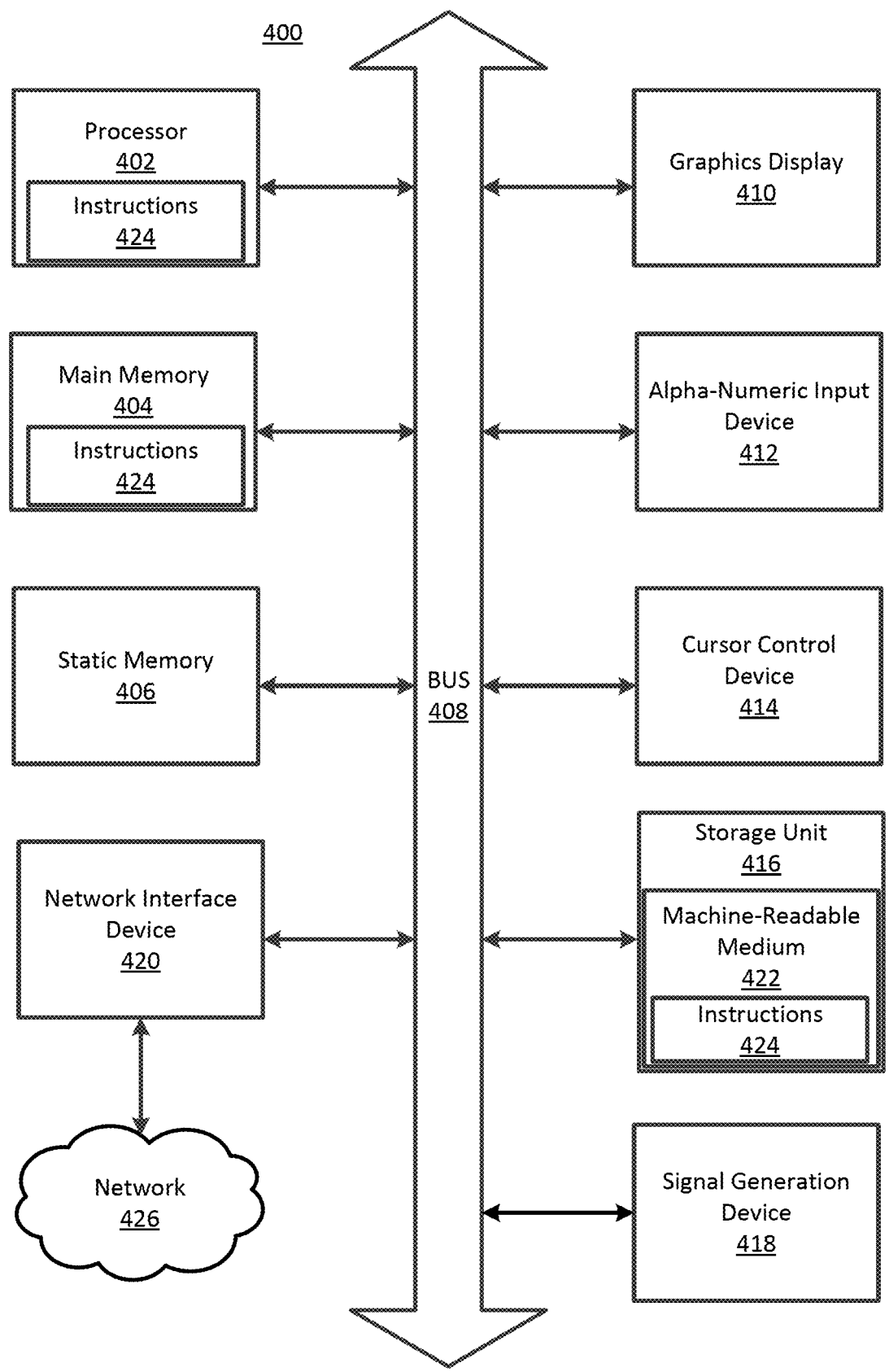
FIG. 4 is a block diagram illustrating components of an example machine for reading and executing instructions from a machine-readable medium.

FIG. 4 is a block diagram illustrating components of an example machine for reading and executing instructions from a machine-readable medium. Specifically, FIGS. 1 and 2 show a diagrammatic representation of computer systems employed throughout the Specification. These systems can be in the example form of a computer system 400. The computer system 400 can be used to execute instructions 424 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 100, or as a peer machine in a peer-to-peer (or distributed) system environment 100.

The machine may be a server computer, a client computer, a personal computer (PC), a tablet PC, a set-top box (STB), a smartphone, an internet of things (IoT) appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processing units (generally processor 402). The processor 402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 400 also includes a main memory 404. The computer system may include a storage unit 416. The processor 402, memory 404, and the storage unit 416 communicate via a bus 408.

In addition, the computer system 400 can include a static memory 406, a graphics display 410 (e.g., to drive a plasma display panel (PDP), a liquid crystal display (LCD), or a projector). The computer system 400 may also include alphanumeric input device 412 (e.g., a keyboard), a cursor control device 414 (e.g., a mouse, a trackball, a joystick, a motion sensor, or other pointing instrument), a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. For example, the instructions 424 may include the functionalities of modules of the systems and modules described in FIG. 1. The instructions 424 may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 may be transmitted or received over a network 426 (e.g., network 150) via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

VI. Additional Considerations

In the description above, for purposes of explanation, numerous specific details are set forth in order to provide a thorough understanding of the illustrated system and its operations. It will be apparent, however, to one skilled in the art that the system may be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present), and B is false (or not present), A is false (or not present), and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for performing the various functionalities described herein. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for providing responses to structured queries about an entity, the method comprising:
   receiving, from a user system at a network system, a request to generate responses to structured queries about an entity;
   generating, automatically using the network system, a set of keywords configured to identify relevant information to generate responses to the structured queries by applying a language model to the request, the language model configured to identify semantically relevant keywords based on the entity and the structured queries;
   extracting, using the network system, relevant data from a source datastore of the entity by applying a similarity model to the source datastore, the source datastore organized in a hierarchical structure comprising a plurality of information nodes in a plurality of layers, and the similarity model, when applied to the source datastore, configured to:
      beginning at a top-most information node of the hierarchical structure, where the top-most information node is identified as a relevant information node:
      for each information node of the plurality determined a relevant information node:
         identify a set of information nodes at a next lower layer of the hierarchical structure, each information node in the set represented by a label on an information node on a current layer of the hierarchical structure, determine, for each information node in the set of
information nodes on the next lower layer of the
hierarchical structure, a relevancy score for the
information node, the relevancy score quantifying similarities between the label on the current layer for the information node on the next
lower layer and the set of keywords,
for each information node having a relevancy
score above a threshold, determine the information node is a relevant information node and
store data at the information node in an entity
datastore as relevant data, and
for each information node having a relevancy
score below the threshold, determine the information node is a non-relevant information
node; and
for each information node of the plurality determined
a non-relevant information node, not determining
whether a set of information nodes at a next lower
layer of the hierarchical structure are relevant
information nodes; and
determining, using the network system, responses to the
structured queries by applying a large language model
to the relevant data extracted from relevant information
nodes stored in the entity datastore, the large language
model configured to:
generate, based on the structured queries, embeddings
configured to determine responses to the structured
queries from the relevant data, and
determine, using the generated embeddings, responses
to the structured queries from the relevant data.

2. The method of claim 1, wherein:
the source datastore comprises the top-most information
node,
the top-most information node is at a highest layer in the
hierarchical structure of the source datastore,
the top-most information node comprises labels to the set
of information nodes, and
the set of information nodes are at the next lower layer
below the highest layer in the hierarchical structure of
the source datastore.

3. The method of claim 2, wherein the similarity model:
determines a first information node in the set of information nodes is a relevant information node and stores
data from the first information node in the entity
datastore, and
determines a second information node in the set of
information nodes is a non-relevant information node.

4. The method of claim 3,
wherein:
the first information node comprises labels to a set of
additional information nodes, and
the set of additional information nodes are at an additional next lower layer below the next lower layer in
the hierarchical structure of the source datastore; and
wherein the similarity model:
identifies a first additional information node in the set
of additional information nodes is a relevant information node and stores information from the first
additional information node in the entity datastore,
and
identifies a second additional information node in the
set of additional information nodes is a non-relevant
information node.

5. The method of claim 1, further comprising:
generating, automatically using the network system, the
structured queries by applying a language model to the
request, the language model configured for identifying
semantically relevant structured queries about the
entity based on the entity and language in the request.

6. The method of claim 5, wherein the structured queries
are automatically generated by the language model without
feedback from the user system.

7. The method of claim 1, wherein the responses to the
structured queries are generated without feedback from the
user system.

8. The method of claim 1, further comprising:
identifying, automatically using the network system, a
source datastore of the entity using the request by
applying a language model to the entity and the request.

9. The method of claim 1, wherein the source datastore is
identified without feedback from the user system.

10. The method of claim 1, wherein:
information in a first information node of the plurality of
information nodes is stored as a type of information,
information in a second information node of the plurality
of information nodes is stored as a second type of
information,
and the first type is different than the second type.

11. The method of claim 1, wherein the similarity model
applies a cosine similarity function to compare information
in each node to the set of keywords.

12. The method of claim 1, wherein the source datastore
is any of a website, a topic graph, a file directory, or an
operating system registry.

13. A non-transitory computer-readable storage medium
comprising computer program instructions for providing
responses to structured queries about an entity, the computer
program instructions, when executed by one or more processors, causing the one or more processors to:
receive, from a user system at a network system, a request
to generate responses to structured queries about an
entity;
generate, automatically using the network system, a set of
keywords configured to identify relevant information to
generate responses to the structured queries by applying a language model to the request, the language
model configured to identify semantically relevant keywords based on the entity and the structured queries;
extract, using the network system, relevant data from a
source datastore of the entity by applying a similarity
model to the source datastore, the source datastore
organized in a hierarchical structure comprising a plurality of information nodes in a plurality of layers, and
the similarity model, when applied to the source datastore, configured to:
beginning at a top-most information node of the hierarchical structure, where the top-most information
node is identified as a relevant information node:
for each information node of the plurality determined
a relevant information node:
identify a set of information nodes at a next lower
layer of the hierarchical structure, each information node in the set represented by a label on
an information node on a current layer of the
hierarchical structure,
determine, for each information node in the set of
information nodes on the next lower layer of the
hierarchical structure, a relevancy score for the
information node, the relevancy score quantifying similarities between the label on the current layer for the information node on the next
lower layer and the set of keywords, for each information node having a relevancy score above a threshold, determine the information node is a relevant information node and store data at the information node in an entity datastore as relevant data, and for each information node having a relevancy score below the threshold, determine the information node is a non-relevant information node; and for each information node of the plurality determined a non-relevant information node, not determining whether a set of information nodes at a next lower layer of the hierarchical structure are relevant information nodes; and determine, using the network system, responses to the structured queries by applying a large language model to using the relevant data extracted from relevant information nodes stored in the entity datastore, the large language model configured to:

generate, based on the structured queries, embeddings configured to determine responses to the structured queries from the relevant data, and determine, using the generated embeddings, responses to the structured queries from the relevant data.

14. The non-transitory storage medium of claim 13, wherein:

the source datastore comprises the top-most information node, the top-most information node is at a highest layer in the hierarchical structure of the source datastore, the top-most information node comprises labels to the set of information nodes, and the set of information nodes are at the next lower layer below the highest layer in the hierarchical structure of the source datastore.

15. The non-transitory storage medium of claim 14, wherein the similarity model:

determines a first information node in the set of information nodes is a relevant information node and stores data from the first information node in the entity datastore, and determines a second information node in the set of information nodes is a non-relevant information node.

16. The non-transitory storage medium of claim 15, wherein:

the first information node comprises labels to a set of additional information nodes, and the set of additional information nodes are at an additional next lower layer below the next lower layer in the hierarchical structure of the source datastore; and wherein the similarity model:

identifies a first additional information node in the set of additional information nodes is a relevant information node and stores information from the first additional information node in the entity datastore, and identifies a second additional information node in the set of additional information nodes is a non-relevant information node.

17. The non-transitory storage medium of claim 13, further comprising:

generating, automatically using the network system, the structured queries by applying a language model to the request, the language model configured for identifying semantically relevant structured queries about the entity based on the entity and language in the request.

18. The non-transitory storage medium of claim 17, wherein the structured queries are automatically generated by the language model without feedback from the user system.

19. A system comprising:

one or more processors; and a non-transitory computer-readable storage medium comprising computer program instructions for providing responses to structured queries about an entity, the computer program instructions, when executed by the one or more processors, causing the one or more processors to:

receive, from a user system at a network system, a request to generate responses to structured queries about an entity;

generate, automatically using the network system, a set of keywords configured to identify relevant information to generate responses to the structured queries by applying a language model to the request, the language model configured to identify semantically relevant keywords based on the entity and the structured queries;

extract, using the network system, relevant data from a source datastore of the entity by applying a similarity model to the source datastore, the source datastore organized in a hierarchical structure comprising a plurality of information nodes in a plurality of layers, and the similarity model, when applied to the source datastore, configured to:

beginning at a top-most information node of the hierarchical structure, where the top-most information node is identified as a relevant information node:

for each information node of the plurality determined a relevant information node:

identify a set of information nodes at a next lower layer of the hierarchical structure, each information node in the set represented by a label on an information node on a current layer of the hierarchical structure, determine, for each information node in the set of information nodes on the next lower layer of the hierarchical structure, a relevancy score for the information node, the relevancy score quantifying similarities between the label on the current layer for the information node on the next lower layer and the set of keywords, for each information node having a relevancy score above a threshold, determine the information node is a relevant information node and store data at the information node in an entity datastore as relevant data, and for each information node having a relevancy score below the threshold, determine the information node is a non-relevant information node; and for each information node of the plurality determined a non-relevant information node, not determining whether a set of information nodes at a next lower layer of the hierarchical structure are relevant information nodes; and determine, using the network system, responses to the structured queries by applying a large language model to the relevant data extracted from relevant information nodes stored in the entity datastore, the large language model configured to:

generate, based on the structured queries, embeddings configured to determine responses to the structured queries from the relevant data, and
determine, using the generated embeddings, responses to the structured queries from the relevant data.

* * * * *